United States Patent
Ku et al.

(10) Patent No.: US 7,146,739 B2
(45) Date of Patent: Dec. 12, 2006

(54) LASER-GUIDING COORDINATION DEVICE FOR A DRILLING MACHINE

(75) Inventors: George Ku, Tali (TW); Eric Lo, Tali (TW)

(73) Assignee: Rexon Industrial Corp., Ltd., Tali (TW)

( * ) Notice: Subject to any disclaimer, the term of this patent is extended or adjusted under 35 U.S.C. 154(b) by 93 days.

(21) Appl. No.: 11/014,934

(22) Filed: Dec. 17, 2004

(65) Prior Publication Data
US 2005/0218191 A1 Oct. 6, 2005

(30) Foreign Application Priority Data
Mar. 16, 2004 (TW) .............................. 93203977 U

(51) Int. Cl.
*G01B 11/27* (2006.01)
(52) U.S. Cl. .................. 33/286; 33/263; 33/280; 33/DIG. 21; 408/16
(58) Field of Classification Search .................. 33/263, 33/276, 278, 279, 280, 286, DIG. 21; 408/13, 408/16
See application file for complete search history.

(56) References Cited

U.S. PATENT DOCUMENTS

| 3,728,027 | A | * | 4/1973 | Watanabe | 33/286 |
| 5,052,112 | A | * | 10/1991 | MacDonald | 33/263 |
| 5,539,990 | A | * | 7/1996 | Le | 33/286 |
| 5,588,216 | A | * | 12/1996 | Rank et al. | 33/286 |
| 5,836,081 | A | * | 11/1998 | Orosz, Jr. | 33/DIG. 21 |
| 6,050,816 | A | * | 4/2000 | Phoenix et al. | 33/286 |
| 6,328,505 | B1 | * | 12/2001 | Gibble | 408/16 |
| 6,898,860 | B1 | * | 5/2005 | Wu | 33/286 |
| 2002/0164217 | A1 | * | 11/2002 | Peterson | 408/16 |
| 2004/0093749 | A1 | * | 5/2004 | Wu | 33/286 |
| 2006/0053643 | A1 | * | 3/2006 | Adrian | 33/286 |
| 2006/0070251 | A1 | * | 4/2006 | Wu | 33/286 |

* cited by examiner

*Primary Examiner*—G. Bradley Bennett
(74) *Attorney, Agent, or Firm*—Dellett & Walters

(57) ABSTRACT

A laser-guiding coordination device for a drilling machine has a C-base, two laser-line projectors oppositely and adjustably embedded inside the C-base. Each laser-line projector has a first adjuster, a second adjuster perpendicularly and rotatably mounted inside the first adjuster, and a laser generator accommodated inside the second adjuster to generate laser lines. By rotating the first and second adjusters, two laser-lines projected to a workpiece are moved in parallel or rotation to adjust and to define a precise laser mark without need for physically drawing lines on the workpiece.

7 Claims, 12 Drawing Sheets

US 7,146,739 B2

LASER-GUIDING COORDINATION DEVICE FOR A DRILLING MACHINE

BACKGROUND OF THE INVENTION

1. Field of the Invention

The invention relates to a laser-guiding coordination device, and more particularly to a laser-guiding coordination device used for a drilling machine to mark drilling positions on a work piece precisely and conveniently.

2. Description of Related Art

In conventionally operational procedures for drilling, a site to be machined on a workpiece has to be coated with a substance such as copper sulfate, "engineers' blue", etc so that the site marked out by drawing lines on the workpieces can be seen. Then, the workpiece is set on the drilling machine and a center bit is attached to a drill chuck received in a spindle of the drilling machine to slightly drill a dimple on the top face to examine whether the workpiece is precisely located or not on the drilling machine. Lastly, once the position of the workpiece relative to the drill chuck is deemed satisfactorily, a drill bit is attached to the drilling chuck to replace the center bit to actually drill holes in the workpiece. Because each piece has to be marked, the operational procedure of marking out is time-consuming, messy and unsatisfactory as the conspicuousness of the lines may be lost through repeated attempts to maneuver the workpiece to the correct position.

With reference to FIGS. 10 to 12, a conventional laser-guiding coordination device comprises a bracket (600) attachable to a power tool (700), the bracket (600) including first and a second bracket receptacles (608a, 608b) therethrough; a first holder (606a) rotatably received in the first bracket receptacle (608a); a second holder (606b) rotatably received in the second bracket receptacle (608b); a first laser generator (604a) mounted in the first holder (606a) at a first angle (β) relative to an axis (B—B) of the first holder (606a) and adjustably projecting a first fan beam (680a); and a second laser generator (604b) mounted in the second holder (606b) at a second angle (β) relative to an axis of the second holder (606b) and adjustably projecting a second fan beam (680b), such that the first and second fan beams (680a, 680b) may be adjusted to intersect along an axis (A—A) of operation of the power tool (700). Drawbacks of this conventional laser-guiding coordination device are:

1. The bracket (600) can not be easily attached to the power tool (70) since a holding rim (not numbered) has to be secured on a front end of the bracket (600) by means of two screws (not numbered) so that attachment of the conventional laser-guiding coordination is troublesome.

2. The conventional laser-guiding coordination device can not be operated easily since the first and the second fan beams moves only in rotations (when the laser generators (604a, 604b) rotate about the D—D axis) and curved routes (when the holders (606a, 606b) rotate about the B—B axis). Therefore, operating the conventional laser-guiding coordination device is not flexible and finding a marking point is inconvenient and needs skilled persons to operate the conventional laser-guiding coordination device.

The present invention has arisen to provide a laser-guiding coordination device mounted on the drilling machine to eliminate or obviate the drawbacks of the conventional marking out process on a workpiece for subsequent machining on a drilling machine.

SUMMARY OF THE INVENTION

The main objective of the present invention is to provide a laser-guiding coordination device adapted to be mounted on a drilling machine to make drilling operations quick, convenient and precise.

Further benefits and advantages of the present invention will become apparent after a careful reading of the detailed description in accordance with the drawings.

DETAILED DESCRIPTION OF THE PREFERRED EMBODIMENT

A laser-guiding coordination device for a drilling machine in accordance with the present invention comprises a C-base, and two laser-line projectors oppositely and rotatably embedded inside the C-base. Each laser-line projector comprises a first adjuster, a second adjuster perpendicularly and rotatably mounted inside the first adjuster, and a laser generator accommodated inside the second adjuster to generate laser lines. By rotating the first and second adjusters, two laser-lines projected to a workpiece are moved in parallel or rotation to adjust and to define a precise laser mark for indicating a drilling site on a workpiece.

Figure 1:
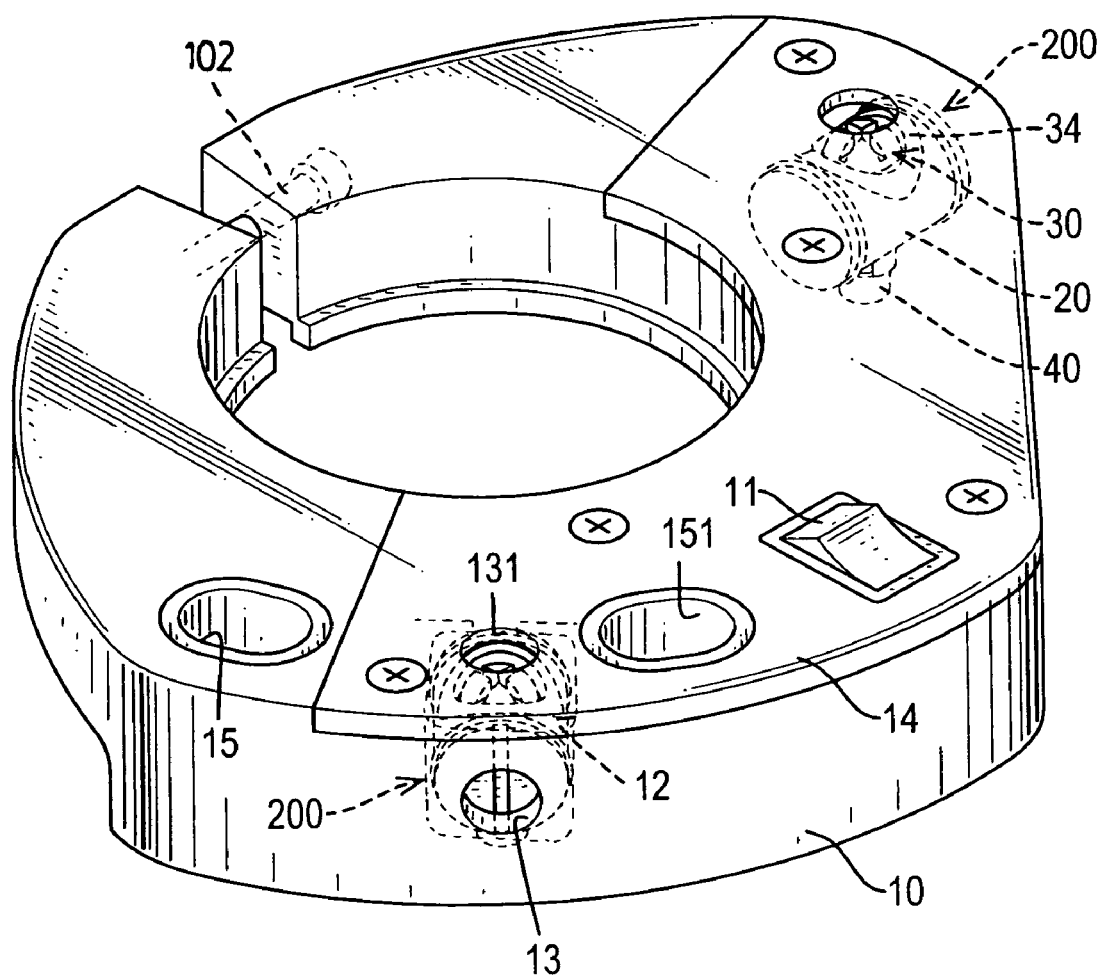
FIG. 1 is a perspective view of a laser-guiding coordination device in accordance with the present invention.
Figure 2:
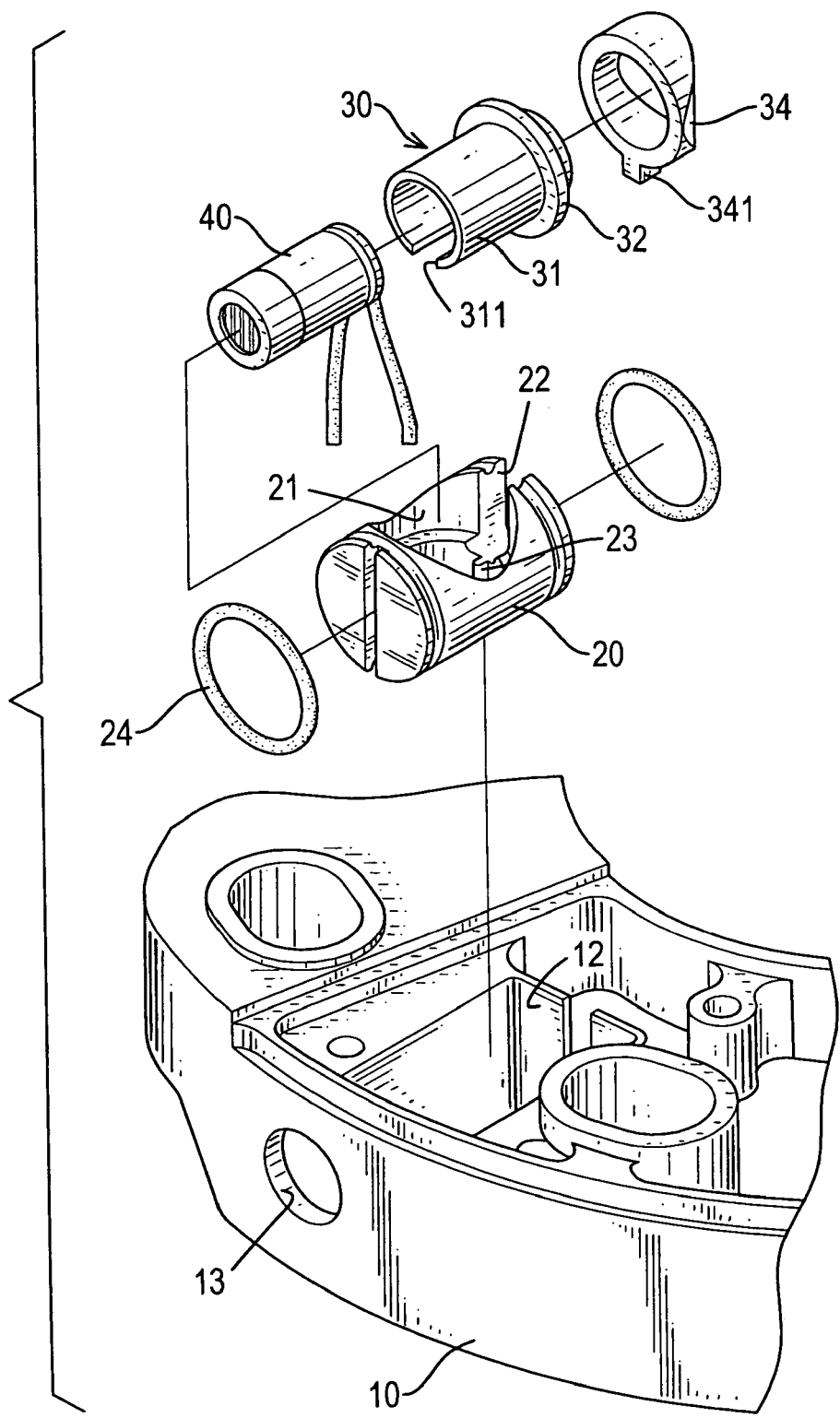
FIG. 2 is an exploded perspective view of the laser-guiding coordination device in FIG. 1.

With reference to FIGS. 1 and 2, a preferred embodiment of the laser-guiding coordination device in accordance with the present invention comprises a C-base (10), two laser-line projectors (200) oppositely embedded inside the C-base (10), and a switch (11) attached to the C-base (10) to electrically connect with the two laser-line projectors (200).

The C-base (10) has a C-shaped body (not numbered) with a top face, an outer side, an inner space, a bottom face and two distal ends and further has a chamber (not numbered), two compartments (12), multiple windows (13, 131), two inserting holes (15, 151), an optional elongated threaded rod (102) and a cover (14). The chamber is defined in a semicircular portion of the C-shaped body and has two ends. The two compartments (12) are respectively formed at the two ends of the chamber to individually accommodate the two laser-line projectors (200). Two side windows (13) are defined in the outer side of the C-base (10) to respectively communicate with the two compartments (12). Two top windows (131) are defined in the top face of the C-base (10) to respectively communicate with the two compartments (12). The two inserting holes (15,151) are defined through the C-base (10) respectively at two sides of one laser-line projector (200). The cover (14) is detachably attached to the C-shaped body to close the chamber and to enclose the two laser-line projectors (200) inside the compartments by means of threaded rods (not numbered). Additionally, the switch (11) is attached on the base (10) and penetrates through the cover (14) to turn on/off the two laser-line projectors (200). The elongated threaded rod (102) screws through one distal end and then screws into another end of the C-shaped body. When the C-base (10) is attached to a mounting post on a drilling machine, the elongated threaded rod (102) screws to make the C-base (10) to fasten or loosen the mounting post.

Each laser-line projector (200) comprises a first adjuster (20), a second adjuster (30), a laser generator (40), an arresting ring (34), and two optional O-rings (24). Each laser-line projector (200) has a power source as commonly known in this field and no further description is needed. The first adjuster (20) is a cylindrical body with a side periphery, a closed end and a slit end and has a sunken hole (21) defined in the cylindrical body from the side periphery in radius. The sunken hole (21) is divided into a lower area (not numbered) and an upper area (not numbered) and has a positioning rib (23) formed on an inner periphery in the lower area. An elongated hole (22) is defined in the slit end to communicate with the upper area in the sunken hole (21). A straight groove (not numbered) is defined in the closed end of the first adjuster (20) and revealed via one corresponding side window (13) in the outer side of the C-base (10). Additionally, two annular grooves (not numbered) are defined on the side periphery respectively near the closed end and the slit end. The two O-rings (24) are attached on the first adjuster (20) at the two annular grooves to provide a gentle damping efficiency to abut the corresponding compartment (12) so that the first adjuster (20) is prevented from freely rotating inside the compartment (12). That is, the first adjuster (20) will move only when operated by the user thereby avoiding false readings being caused if the first adjuster (20) undesirably moved through vibration of the drilling machine, etc.

The second adjuster (30) is rotatably accommodated inside the sunken hole (21) in the first adjuster (20). The second adjuster (30) is a tubular body with two ends and an inner space and has a sidewall (not numbered), a knob head (32) and a slit (311). The knob head (32) is formed on one end of the tubular body and has a rim (not numbered) formed around and at a joint between the tubular body and the knob head (32). The slit (311) is longitudinally defined in the sidewall of the tubular body to movably receive the positioning rib (23) of the first adjuster (20) inside when the second adjuster (30) perpendicularly engages with the first adjuster (20). Wherein, the slit (311) has a width larger than a width of the positioning rib (23) so that the second adjuster (20) is rotatable but limited its rotation within the range of the width of the slit (311).

The laser generator (40) is firmly accommodated inside the inner space of the second adjuster (30) and generates a laser line to emit from the bottom face of the C-base (10).

The arresting ring (34) is mounted on the knob head (32) and has an abutting face, a bulged face and a stub (341) formed on an outer periphery of the arresting ring (34). When the arresting ring (34) is mounted on the knob head (32), the abutting face abuts the rim on the second adjuster (30). When the second adjuster (30) is accommodated inside the sunken hole (21) in the first adjuster (20), the stub (341) movably extends into the elongated hole (22) and the bulged face is smoothly flushed with the side periphery of the first adjuster (20). Meanwhile, the knob head (32) reveals via a central hole in the arresting ring (34) to allow users to drive the second adjuster (30).

Figure 3:
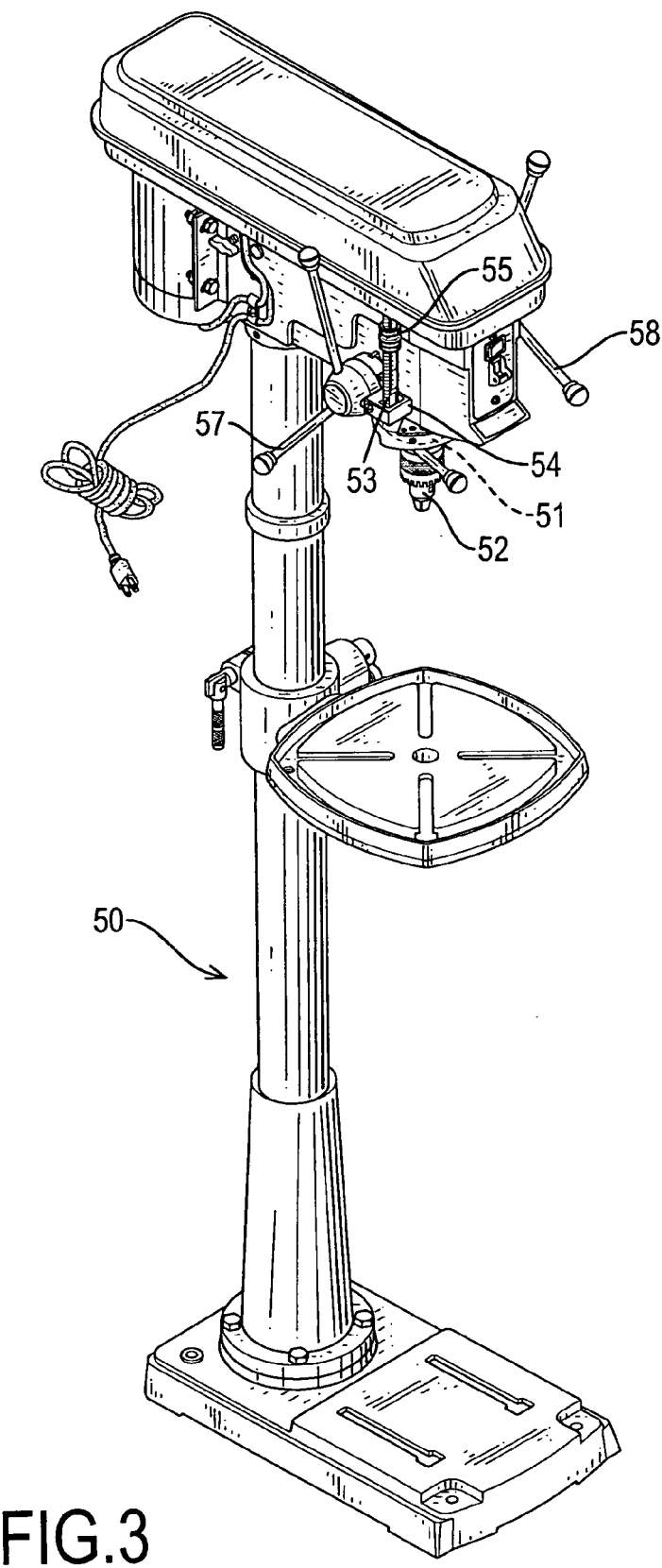
FIG. 3 is an operational perspective view showing the laser-guiding coordination device mounted on a drilling machine.

With reference to FIG. 3, the laser-guiding coordination device is adapted to mount on a drilling machine (50) by securing the C-base (10) on a drilling head (51) with a drill chuck (52). The drilling machine (50) comprises a stand (not numbered), a controlling housing mounted on the stand, two levers (57, 58) respectively attached at two sides of the controlling housing, and a threaded rod (53) attached under the controlling housing near the drilling head (51). The two levers (57, 58) both control the drilling head (51) to move upward or downward. The threaded rod (53) has a base (54) attached to a distal end of the threaded rod (53) and a pair of lock nuts (55) rotatably mounted on the threaded rod (53). Calibrations are marked on the threaded rod (53) for adjusting a height of the lock nuts (55), wherein the height of the nuts relative to the base (54) decides a depth of drilling into the workpiece. The lock nuts (55) are well known to those skilled in the art and are not described in further detail.

Figure 8:
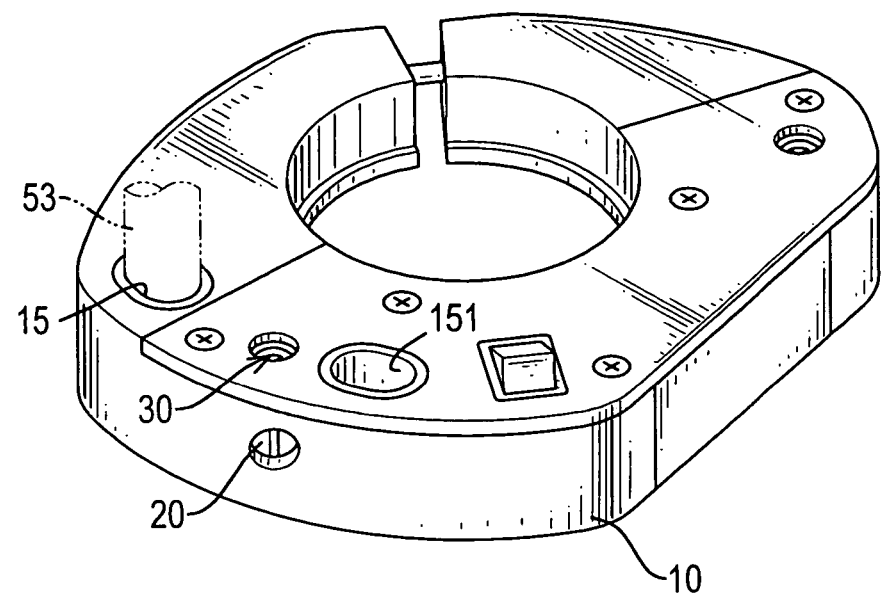
FIG. 8 is a schematically operational view of attaching the laser-guiding coordination device on the drilling machine via a left inserting hole to enable a left-handed person to conveniently use the device on the drilling machine.
Figure 8:
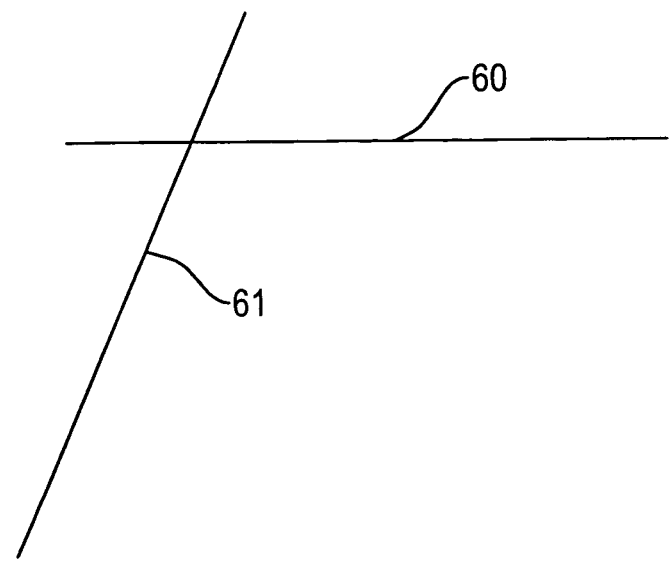
Figure 9:
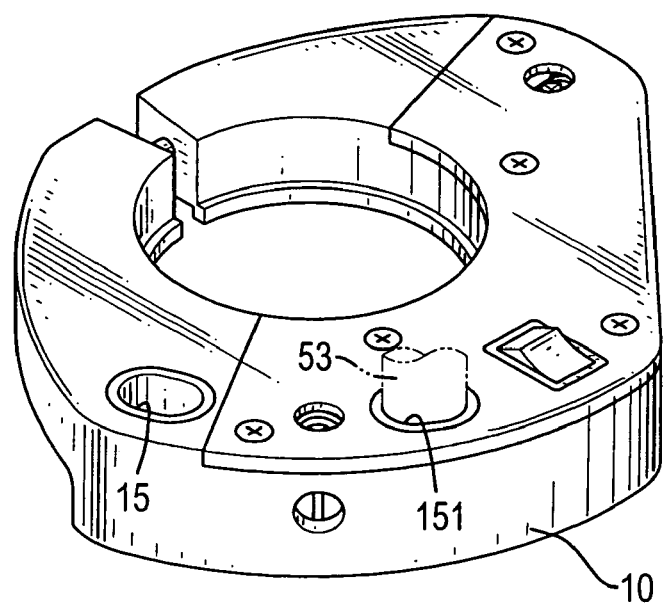
FIG. 9 is a schematically operational view of attaching the laser-guiding coordination device on the drilling machine via a right inserting hole to enable a right-handed person to conveniently use the device on the drilling machine.
Figure 9:
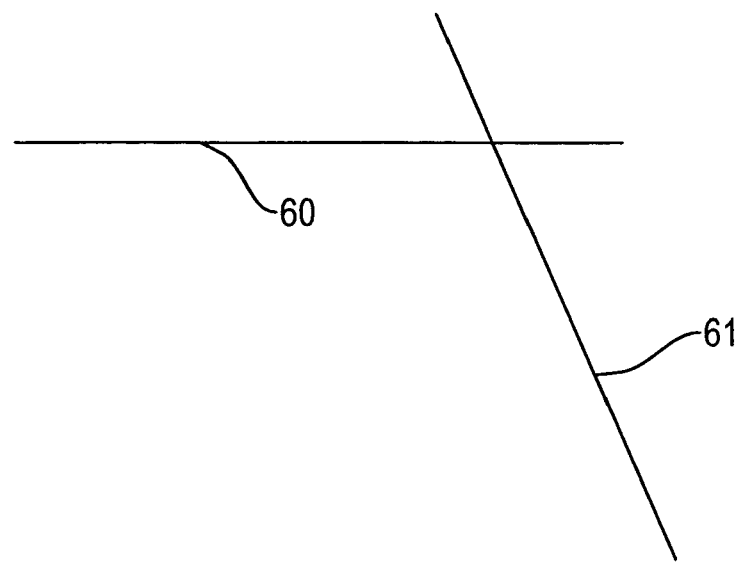
Figure 10:
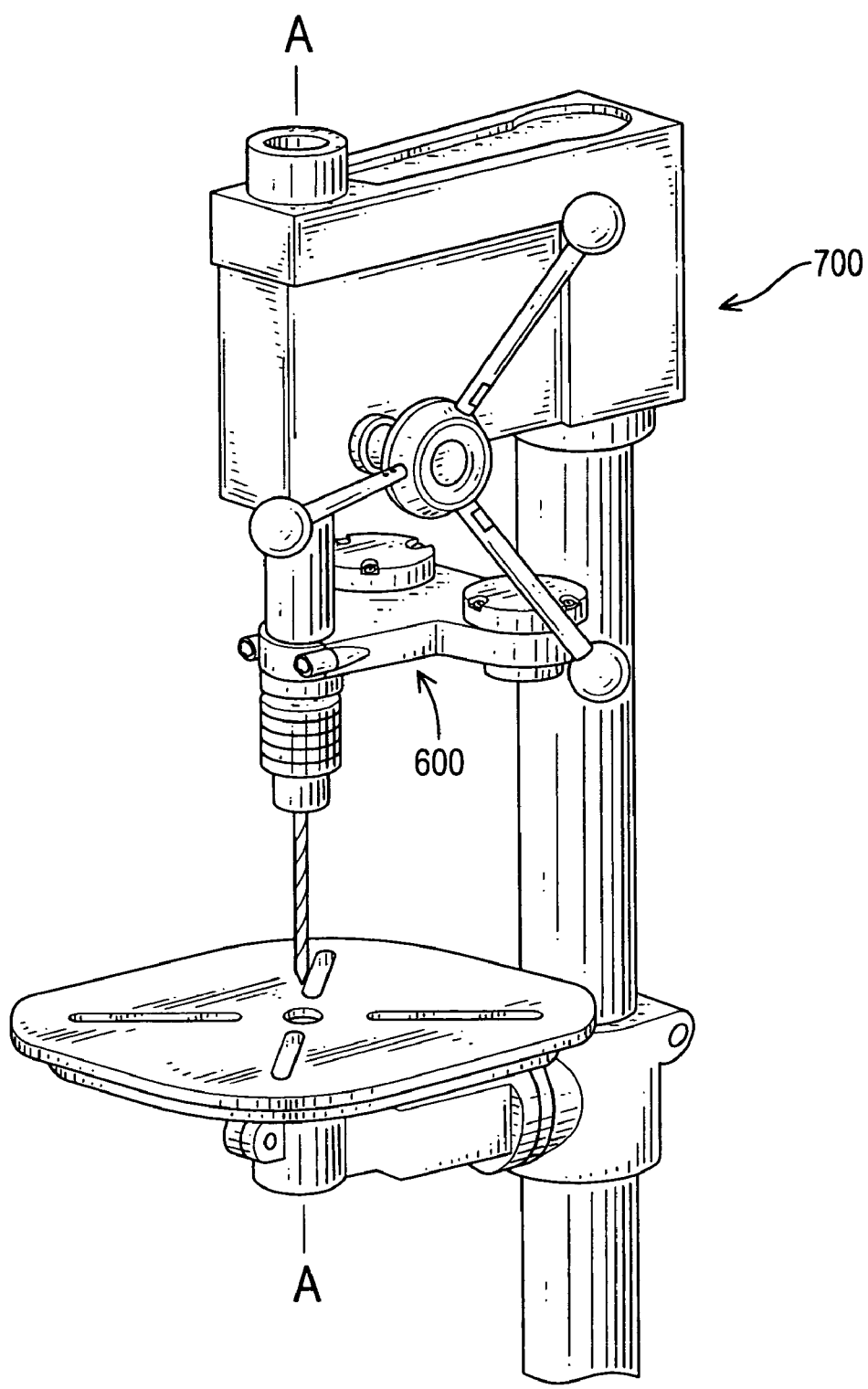
FIG. 10 is an operational perspective view showing a conventional laser-guiding coordination device mounted on a drilling machine.
Figure 11:
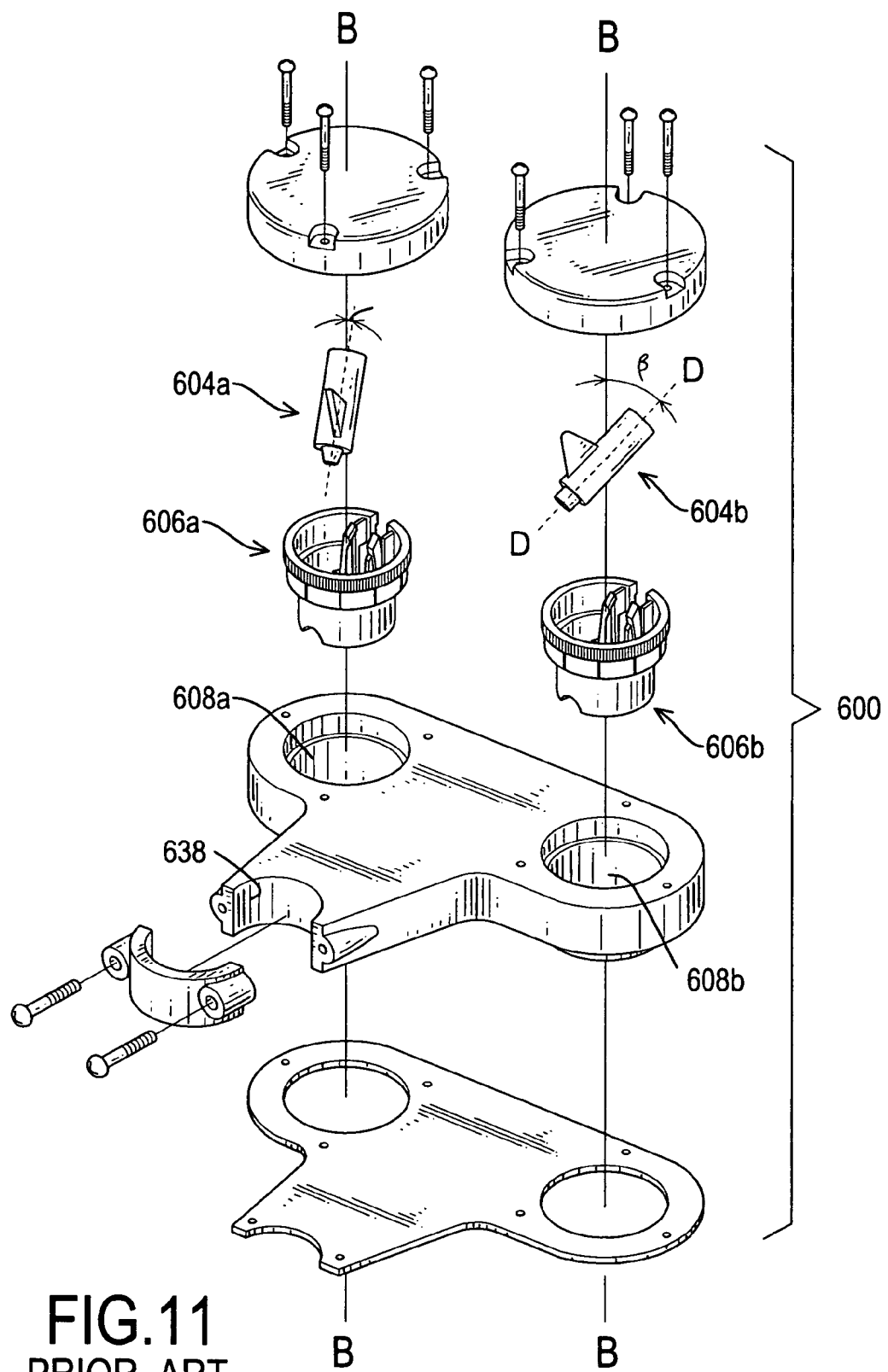
FIG. 11 is an exploded perspective view of the conventional laser-guiding coordination device in FIG. 10.
Figure 12:
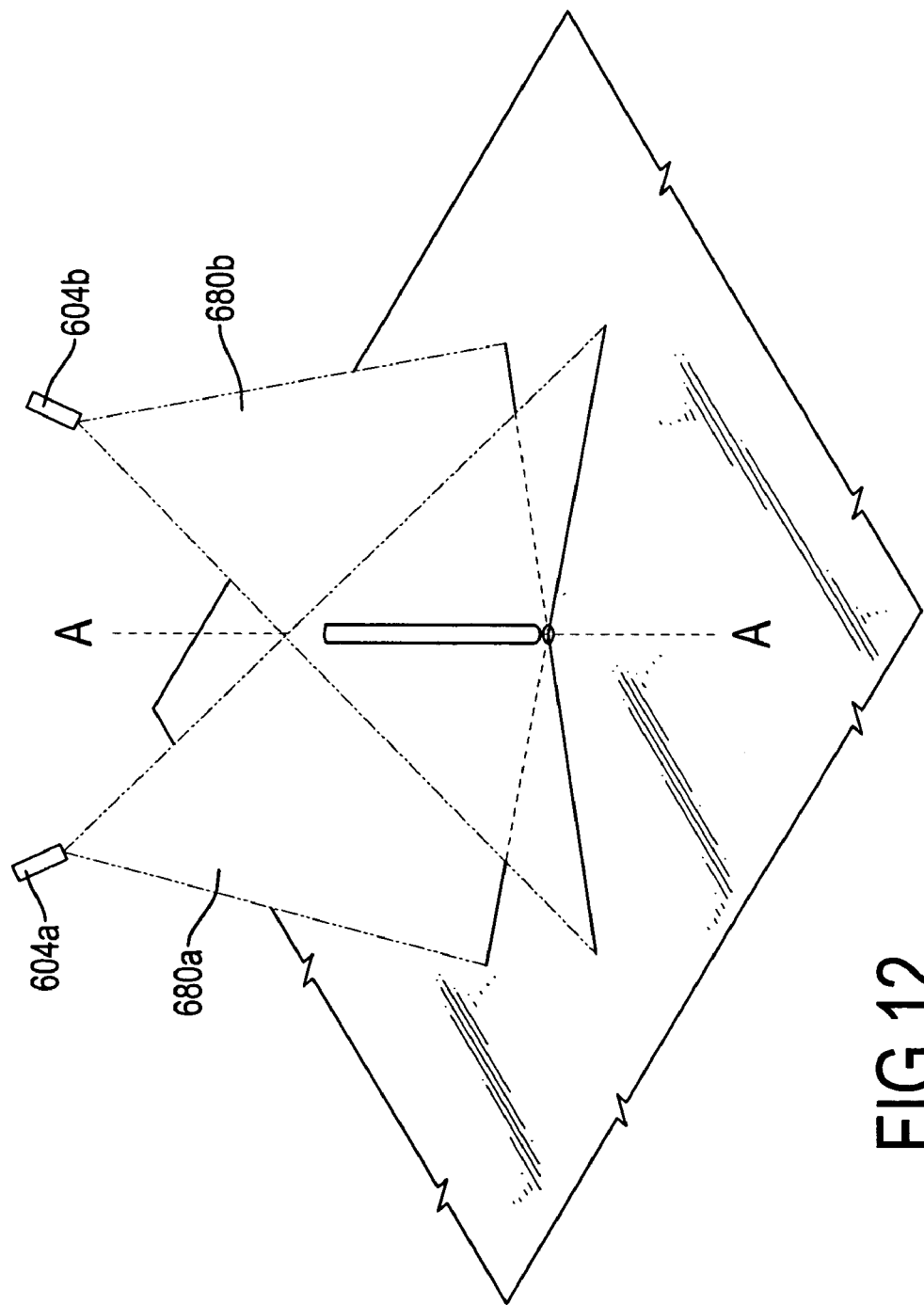
FIG. 12 is an operational schematic view showing the movement of fan beams from two laser generators.

With further reference to FIGS. 8 and 9, the threaded rod is adapted to selectively engage with one of the two inserting holes (15,151) for right-handed or left-handed users. For example, engaging with the inserting hole (15) at a left side of the laser-line projector (200) generally makes a right-side vision clear so that the user is convenient to use left hand. Consequently, engaging with the inserting hole (151) at a right side of the laser-line projector (200) makes the result contrary to the left side inserting hole.

Figure 4:
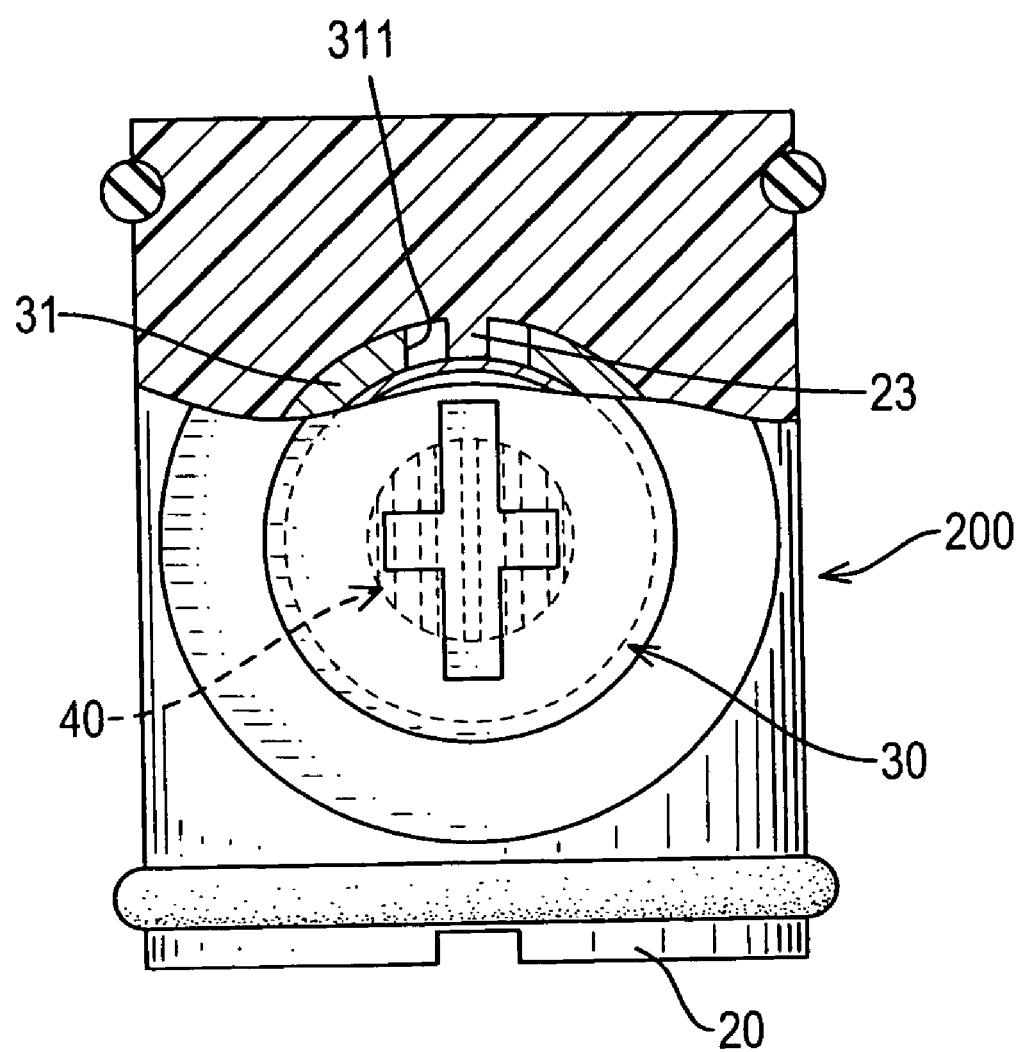
FIG. 4 is a partially cross-sectional bottom plane view of a second adjuster on one laser projector, wherein a first adjuster is arranged perpendicularly to the second adjuster.
Figure 5:
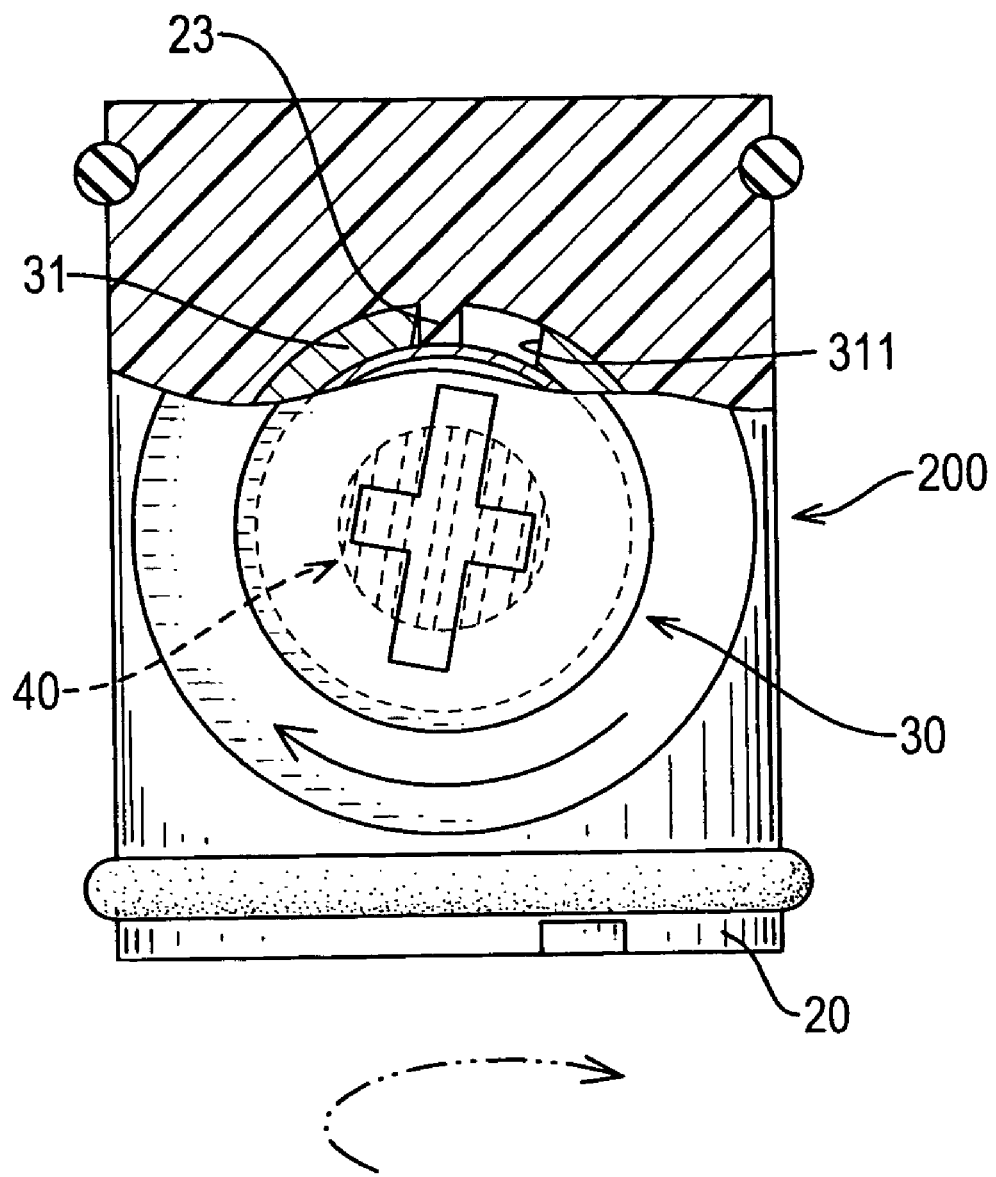
FIG. 5 is an operational perspective view showing adjustment of the second adjuster and the first adjuster in FIG. 4.
Figure 6:
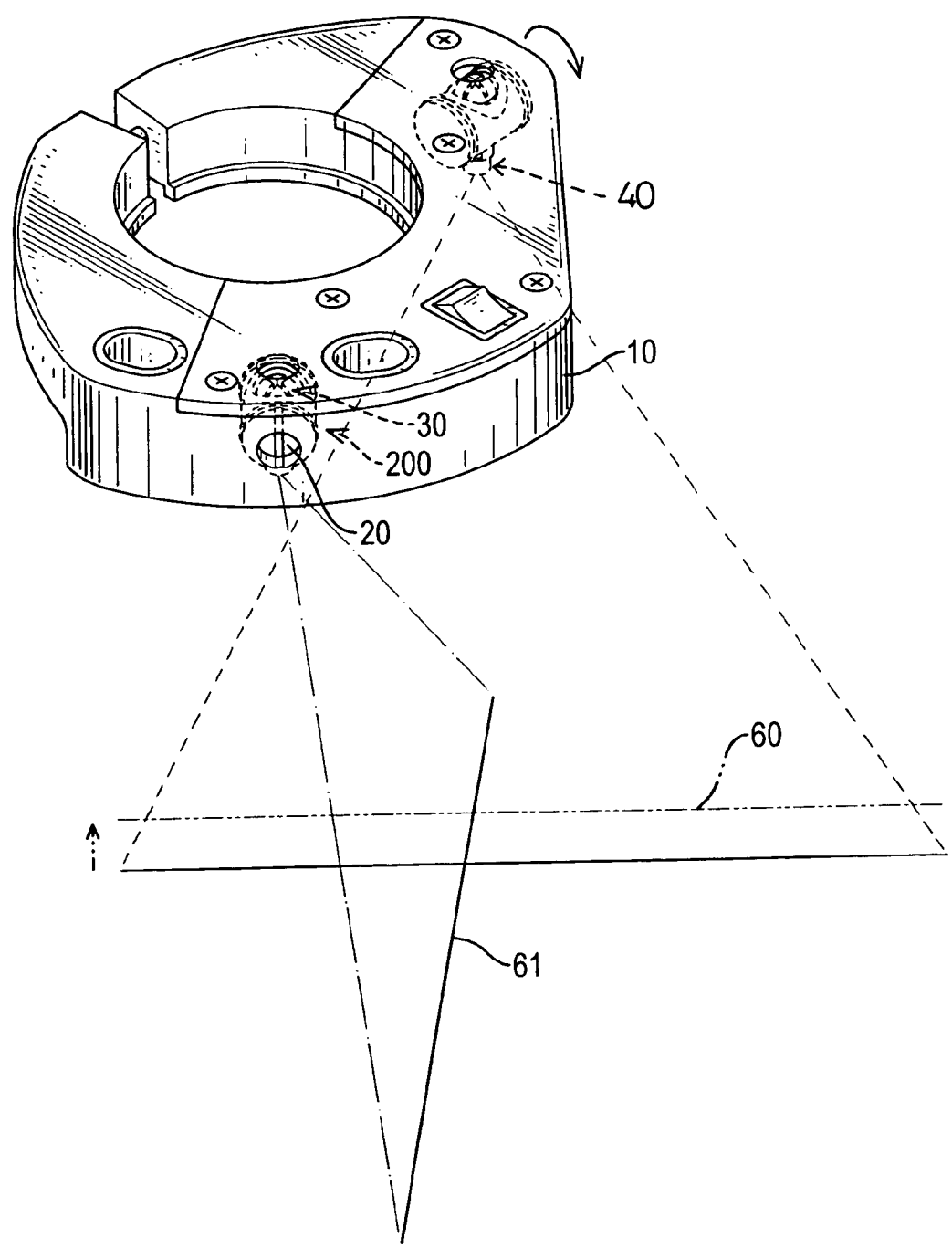
FIG. 6 is a schematically operational view of driving the second adjuster, wherein a laser marking line is moved in parallel.
Figure 7:
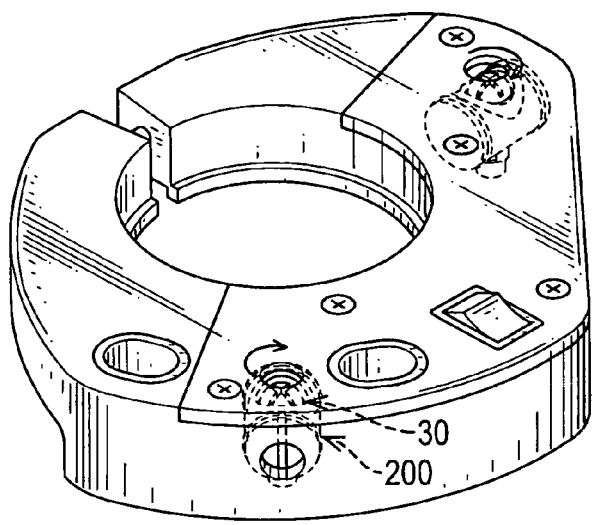
FIG. 7 is a schematically operational view of driving the first adjuster, wherein a laser marking line is moved in rotation.
Figure 7:
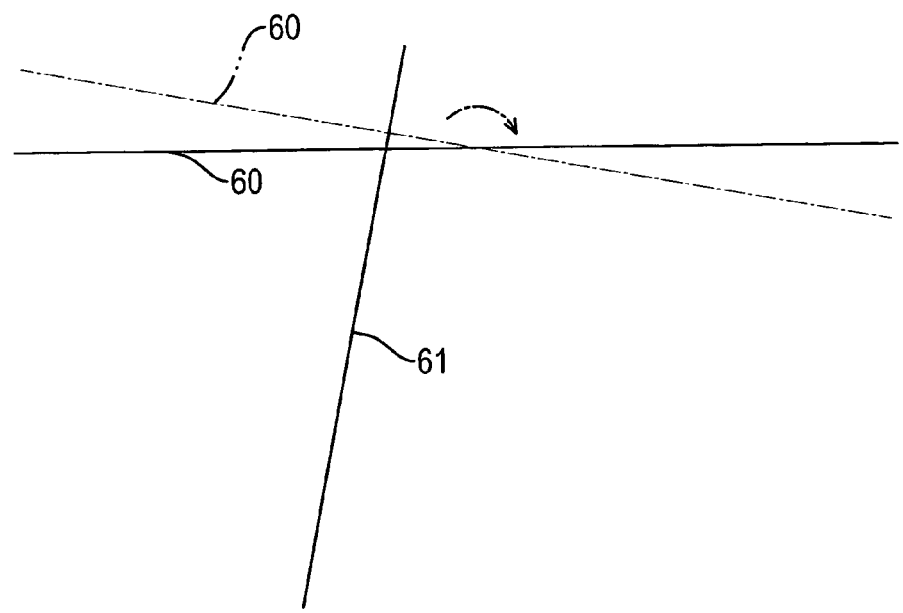

With reference to FIGS. 4, 5 and 6, when the first adjuster (20) is rotated via the side window (13), the laser line from the laser-line projector (200) moves in parallel. With reference to FIGS. 5 and 7, when the second adjuster (30) is rotated via the top window (131), the laser line from the laser-line projector (200) moves in rotation. Therefore, the two adjusters (20, 30) enable a user to adjust the orientation to make the two laser-lines intersect to define a laser mark for precise yet quick drilling of the workpiece.

According to the above description, the laser-guiding coordination device can mark a laser drilling point conveniently and precisely by individually rotating the first and second adjusters (20, 30) to avoid pre-drilling by the central bit in the conventional drilling method. Therefore, drawing marks on the working pieces is obviated to save time in drilling processes. Moreover, in comparison with the conventional laser guiding coordination device, the present invention has the laser line moving in a rotation movement and a parallel movement but not in a curved route. Therefore, operation of the present invention is easy and convenient.

Although the invention has been explained in relation to its preferred embodiment, many other possible modifications and variations can be made without departing from the spirit and scope of the invention as hereinafter claimed.

What is claimed is:

1. A laser-guiding coordination device for a drilling machine comprising:
   a C-base being a C-shaped body with a top face, an outer side, an inner space and a bottom face and having two compartments oppositely formed inside the C-base;
      two side windows defined in the outer side of the C-base to respectively communicate with the two compartments; and
      two top windows defined on the top face of the C-base to respectively communicate with the two compartments; and
   two laser-line projectors respectively accommodated inside the two compartments to emit laser-lines from the bottom face of the C-base, each laser-line projector comprising:
      a first adjuster being a cylindrical body with a side periphery, a closed end revealed via the side windows and a slit end and having
         a sunken hole defined from the side periphery in radius and divided into a lower area and an upper area; and
         a positioning rib formed on an inner periphery of the sunken hole in the lower area; and
         an elongated hole defined in the slit end to communicate with the upper area in the sunken hole;
      a second adjuster rotatably accommodated inside the sunken hole in the first adjuster, being a tubular body with two ends and an inner space, and having
         a sidewall;
         a knob head formed on one end of the tubular body and revealed via a corresponding one of the top windows of the C-base; and
         a slit longitudinally defined in the sidewall of the tubular body to movably receive the positioning rib of the first adjuster;
      a laser generator firmly accommodated inside the inner space of the second adjuster and generates a laser line; and
      an arresting ring mounted on the knob head.

2. The laser-guiding coordination device as claimed in claim 1, wherein the C-base further has two inserting holes defined through the C-base respectively at two sides of one of the laser-line projectors.

3. The laser-guiding coordination device as claimed in claim 1, wherein the C-base further has a chamber defined in a semicircular portion of the C-shaped body and having two ends; and
   a cover mounted over the chamber in the C-base;
   wherein, the two compartments are respectively formed at the two ends of the chamber.

4. The laser-guiding coordination device as claimed in claim 2, wherein the C-base further has a chamber defined in a semicircular portion of the C-shaped body and having two ends; and
   a cover mounted over the chamber in the C-base;
   wherein, the two compartments are respectively formed at the two ends of the chamber.

5. The laser-guiding coordination device as claimed in claim 4, wherein a switch is attached on the C-base and penetrates the cover to control turn actuation of the two laser-line projectors.

6. The laser-guiding coordination device as claimed in claim 1, wherein the first adjuster of each laser-line projectors further has
   a straight groove defined in the closed end of the first adjuster; and
   two annular grooves defined in the side periphery respectively near the closed end and the slit end; and
   two O-rings respectively attached on the first adjuster at the two annular grooves.

7. The laser-guiding coordination device as claimed in claim 1, wherein the second adjuster of laser-line projectors further has a rim formed around near a joint between the tubular body and the knob head;
   wherein, the arresting ring further has an abutting face, a bulged face and a stub formed on an outer periphery of the arresting ring to movably extend into the elongated hole of the first adjuster.

* * * * *